(12) United States Patent
Deichstetter

(10) Patent No.: US 6,788,783 B1
(45) Date of Patent: Sep. 7, 2004

(54) DIGITAL LOOP CARRIER SYSTEM WITH ENHANCED CALL HANDLING AND METHOD

(75) Inventor: Eric Anton Deichstetter, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 791 days.

(21) Appl. No.: 09/624,561

(22) Filed: Jul. 24, 2000

(51) Int. Cl.[7] .................................................. H04M 1/00
(52) U.S. Cl. ...................................... 379/338; 370/352
(58) Field of Search ........................... 379/201.01, 338, 379/211.01, 210.01, 219, 93.07; 370/352

(56) References Cited

U.S. PATENT DOCUMENTS

| 6,125,177 | A | * | 9/2000 | Whittaker | 379/243 |
| 6,289,097 | B1 | * | 9/2001 | Gregory et al. | 379/338 |
| 6,363,079 | B1 | * | 3/2002 | Barzegar et al. | 370/465 |

OTHER PUBLICATIONS

DSET, "EZSwitchAccess: Meeting the Challenge of Integrating Voice Over Packet with the Public Switched Telephone Network," http://www.dset.com/products/network/GR303paper.html, printed Jun. 4, 2000.

International Telecommunication Union, "Q.850 Series Q: Switching and Signalling Digital Subscriber Signalling System No. 1—General," http://www.itu.int/itudoc/itu–t/rec/q/q500–999/q850.html, May 1998.

Joel Weinberger, "Cisco Router ISDN Dial Backup Design and Implementation," http://www.ins.com/knowledge/whitepapers/routing97.asp, printed Jun. 4, 2000.

* cited by examiner

Primary Examiner—Creighton Smith

(57) ABSTRACT

When receiving a request from a telecommunications switch (106) for a telephone call to a party, a loop carrier (108) checks for errors and availability in the distribution resources that couple the called party to the digital loop carrier (108). For a distribution resource error or unavailability, the digital loop carrier (108) generates a distribution resource error message that is transmitted to the telecommunication switch (106). The telecommunication switch (106) applies terminating call features for the called party, such as voice mail or call forwarding, in response to the distribution resource error message.

29 Claims, 2 Drawing Sheets

DIGITAL LOOP CARRIER SYSTEM WITH ENHANCED CALL HANDLING AND METHOD

FIELD OF INVENTION

The invention relates generally to digital loop carrier systems in telecommunications networks, and in particular, to enhanced call handling for distribution resource errors in digital loop carrier systems.

BACKGROUND OF THE INVENTION

When a calling party places a telephone call, a request for a telephone call connection to a called party is submitted over a telephone network. A telecommunications switch terminating the called party receives this request and determines which telephone line and associated customer premise equipment the telephone call connection is intended for. The telecommunications switch then checks whether the line is free for a telephone connection. If the line is available, the telecommunications switch establishes a telephone connection to the customer premise equipment. If the line and customer premise equipment are not available, the telecommunications switch returns a busy signal to the calling party indicating that the customer premise equipment is currently in use or unavailable. As an alternative to the busy signal, the telecommunications switch terminates the telephone call connection, request and applies terminating call features associated with the line such as voice mail and call forwarding. The terminating call features enhance call handling for the unsuccessful calling party.

Digital loop carrier systems are known. Generally, in digital loop carrier systems, a digital loop carrier is inserted between the telecommunications switch and customer premise equipment to increase the efficiency of the resources used for the telephone network. In particular, not all customer premise equipment connected to a telecommunications switch is used at the same time. Therefore, only a percentage of the direct connections between the telecommunications switch and the customer premise equipment are necessary at any given time. A digital loop carrier attached to the telecommunications. switch exploits this by cycling limited resources to the connected customer premise equipment only when telephone service is required, which reduces the amount of fixed lines needed for telephone connections.

The digital loop carrier is connected to the telecommunications switch via a trunk connection, such as a DS1 connection. The digital loop carrier is connected to the customer premise equipment via distribution resources such as optical networking units (ONU), integrated access devices (IAD), trunks, and/or fiber optic and copper lines. The digital loop carrier communicates with the telecommunications switch via a standard protocol, such as the Telcordia Publication GR-303-CORE subset of the Q. 931 International Telecommunications Union messaging standard ("GR-303"). According to the GR-303 standard, the messages, which include cause codes, are communicated between the digital loop carrier and the telecommunications switch for establishing telephone calls.

A successful call to a customer premise equipment terminated by a digital loop carrier connected to a telecommunications switch begins with the telecommunications switch receiving a telephone connection request to the line associated with the customer premise equipment. The telecommunications switch checks its internal status of the desired line to the customer premise equipment to determine if the line is available. If the line is available, the telecommunications switch then sends a "setup" message to the digital loop carrier specifying which path to receive the telephone call. If there are sufficient resources from the digital loop carrier to the desired line and customer premise equipment, the digital loop carrier sends a "connect to the digital loop carrier" message to the telecommunications switch. The telecommunications switch then uses the path to ring and establish a telephone connection with the customer premise equipment.

An unsuccessful call to a customer premise equipment terminated by a digital loop carrier connected to a telecommunications switch begins with the telecommunications switch receiving a telephone connection request to the customer premise equipment. As before, the telecommunications switch checks its internal status of the desired line to the customer premise equipment to determine if the line is available. If the internal status of the telecommunications switch indicates the desired line is available, the telecommunications switch then sends a "setup message" to the digital loop carrier specifying which path to receive the telephone call. The digital loop carrier then determines, in response to the "setup" message whether there are sufficient available resources to the desired customer premise equipment. If the digital loop carrier has a problem connecting to the customer premise equipment, for example due to a lack of resources or a fault, then the digital loop carrier rejects the "setup message" by sending a "reject message" indicating a temporary failure without further explanation. This results in a "fast busy" or reorder signal being transmitted to the calling party by the telecommunications switch. Unfortunately, the telecommunications switch does not apply terminating call features, such as voice mail or call forwarding, after determining the line is available and sending the "setup" message. This is because, at least with regard to the switch's view of the line, the line is available for a call. In addition, the temporary failure in the "reject" message is ambiguous and does not cause the telecommunications switch to apply terminating call features. The return of a reorder signal to the calling party where there is a lack of resources or fault between the digital loop carrier and the customer premise equipment is undesirable because the calling party must reinitiate the call rather than leaving a message or being forwarded to another line.

Therefore, a need exists for a system that applies terminating call features when an error occurs in the distribution resources or in the customer premise equipment terminated by a digital loop carrier.

SUMMARY OF THE INVENTION

In accordance with one aspect of the present invention a method is provided for call establishment to a customer premise equipment. The customer premise equipment is connected to a digital loop carrier via distribution resources. The digital loop carrier is connected to a telecommunications switch. The method is initiated upon the receipt of a request for a telephone call to the customer premise equipment made by the telecommunications switch to the digital loop carrier. After the request for a telephone call is received by the digital loop carrier, a determination is made as to whether the customer premise equipment is available. If the custom premise equipment is not available, for example, due to the unavailability of a distribution resource an error occurring in the distribution resources, or an error in the customer premise equipment, the digital loop carrier generates and transmits a distribution resource error message indicating the error. The telecommunications switch preferably receives the distribution resource error message and applies terminating call features for the customer premise equipment. The terminating call features include, for example, call forwarding and voice mail In another aspect of the present invention, a telecommunications system is provided. The telecommunications system includes a telecommunications switch coupled to a digital loop carrier. The digital loop carrier couples to customer premise equipment for the transmission of telephone calls. In response to a request from the telecommunications switch to place a telephone call to the customer premise equipment that is coupled to the digital loop carrier, the digital loop carrier determines whether a telephone connection may be established between the digital loop carrier and the customer premise equipment. If a call cannot be established between the digital loop carrier and the customer premise equipment, for example, due to a lack of distribution resources, then the digital loop carrier returns a distribution resource error to the telecommunications switch. Preferably, the telecommunications switch applies a terminating call feature.

DETAILED DESCRIPTION OF THE PREFERRED EMBODIMENTS

Figure 1:
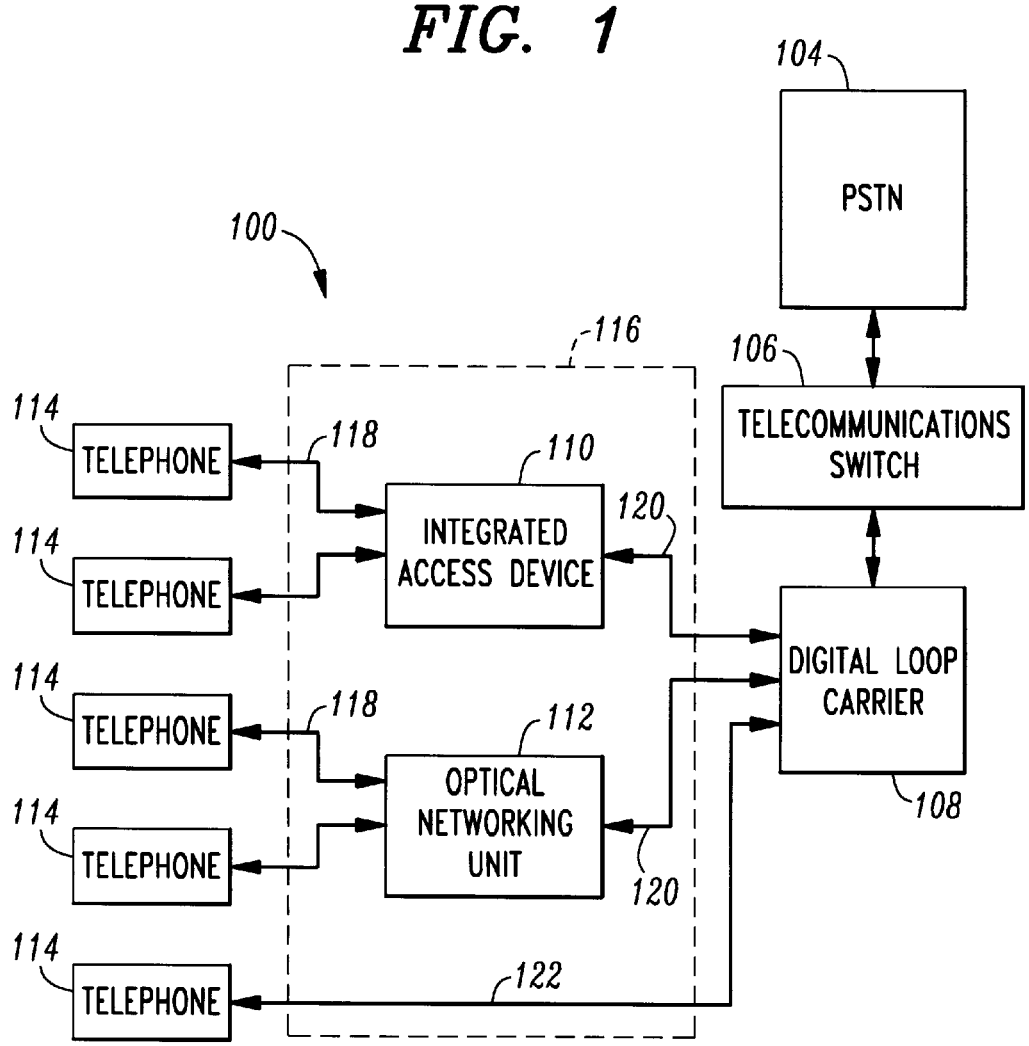
FIG. 1 is a block diagram of a telecommunications network system, including a telecommunications switch and a digital loop carrier in accordance with the present invention.

FIG. 1 is a block diagram of a telecommunications network system 100 in accordance with the present invention. The telecommunications network system 100 includes a public switched telephone network 104 (PSTN), a telecommunications switch 106, and a digital loop carrier 108. The telecommunications switch 106 interfaces customer premise equipment to the PSTN 104 via a digital loop carrier 108 and distribution resources 116. As shown in FIG. 1, the distribution resources 116 are components that connect the digital loop carrier 108 to the customer premise equipment. Exemplary distribution resources shown in FIG. 1 are an integrated access device 110, an optical network unit 112, a line 118, trunk connections 120, and wire 122. More specifically, digital loop carrier 108 is connected to optical networking unit 112 and integrated access device 110 through trunk connections 120. The customer premise equipment, telephones 114, are then coupled to the optical networking unit 112 or integrated access device 100 through lines. In addition, a telephone 114 is directly connected to digital loop carrier 108 via wire 122.

Telecommunications switch 106 is any suitable telephone switch that couples to a telephone network for the receipt and transmission of telephone calls on the one hand, and couples to a digital loop carrier on the other hand. Preferably, telecommunications switch 106 is a 5ESS® class switch that is processor-based and controlled by stored programs to implement the functions of the invention specified herein. Most preferably, telecommunications switch 106 implements the Telcordia Publication GR-303-CORE subset of the Q. 931 International Telecommunications Union messaging standard used to communicate between switches and digital loop carriers and acts as a integrated digital terminal (IDT), as that term is used in the GR303 standard.

Digital loop carrier 108 is any suitable digital loop carrier that connects customer premise equipment to switches for the receipt and transmission of telephone calls. Exemplary digital loop carriers are the AnyMedia Access System and SLC 2000, both available from Lucent Technologies, Murray Hill, N.J. Preferably digital loop carrier 108 is processor-based and executes stored programs to implement the functions specified herein. Most preferably, digital loop carrier 108 implements the Telcordia Publication GR-303-CORE subset of the Q. 931 International Telecommunications Union messaging standard used to communicate between switches and digital loop carriers and acts as a remote digital terminal (RDT), as that term is used in the GR303 standard.

The distribution resources 116 used to operably couple customer premise equipment to digital loop carriers are well known to those of skill in the art. Integrated access device 110 is, for example, a digital subscriber line facility such as asynchronous digital subscriber line (ADSL), or synchronous digital subscriber line (SDSL). An exemplary integrated access device 110 is the CellPipe-IAD-4S available from Lucent Technologies, Murray Hill, N. J. An exemplary optical networking unit 112 is the AnyMedia Optical Networking Unit available from Lucent Technologies, Murray Hill, N.J. Other facilities for distribution resources include wireless interfaces and T1 facilities.

Figure 2:
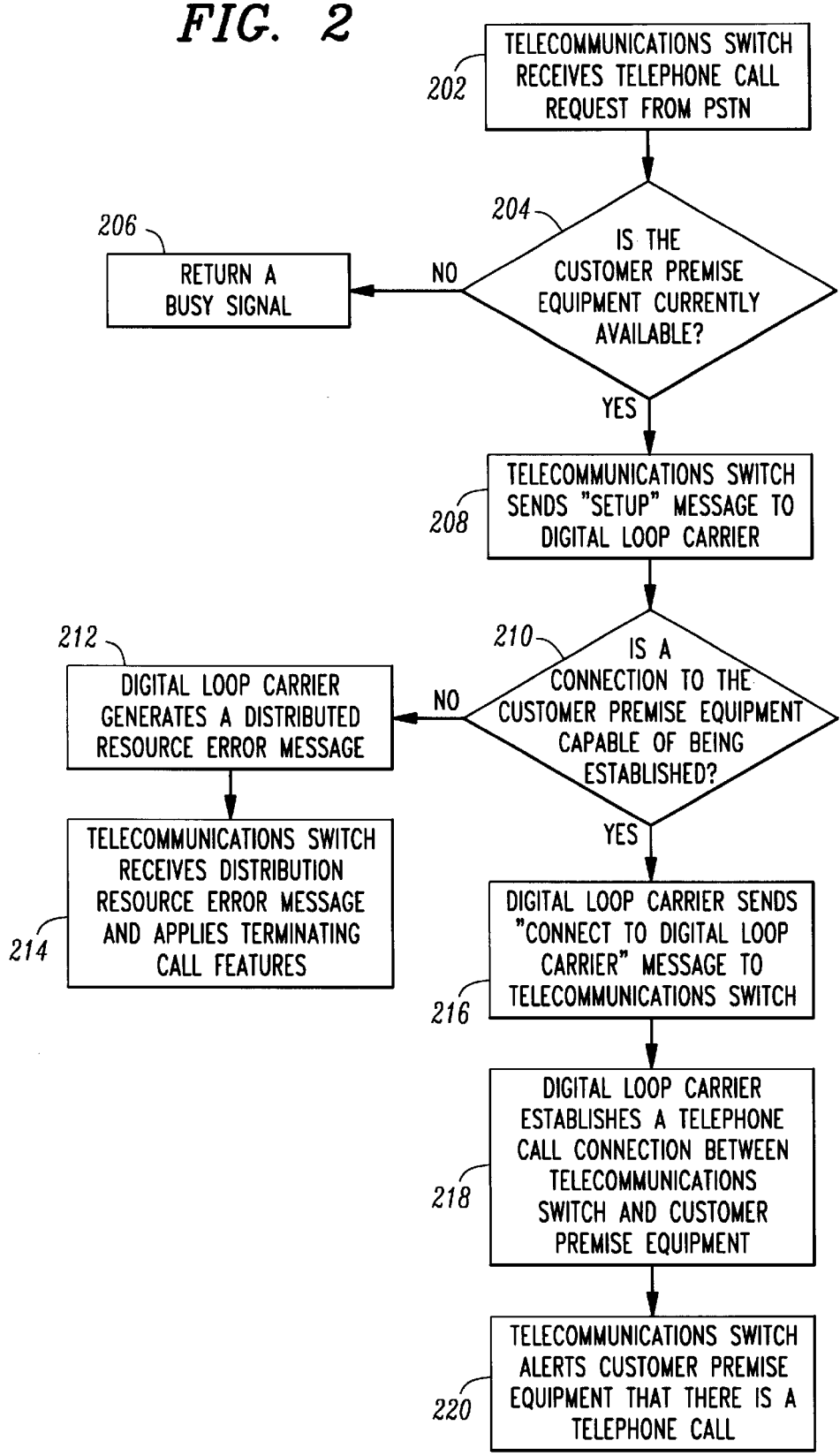
FIG. 2 is a flow chart illustrating a method of generating a distribution resource error and applying terminating call features in accordance with the present invention.

FIG. 2 is a flow chart illustrating a method of generating a distribution resource error and for applying terminating call features in accordance with the present invention. FIG. 2 is described below with reference to the telecommunications network system in FIG. 1.

First, the telecommunications switch 106 receives a telephone call request for a called party from the PSTN 104 requesting a connection with a customer premise equipment, for example, a telephone 114 (202). The telecommunications switch 106 then internally checks if the line to the customer premise equipment is in use (204). Preferably, the telecommunications switch 106 checks for an active telephone connection to the line associated with the customer premise equipment. If the customer premise equipment is currently in use, the telecommunications switch 106 transmits a signal to the PSTN 104 indicating the line is unavailable (206). Preferably, the telecommunications switch 106 returns a busy signal to the PSTN 104 or applies terminating call features such as voice mail or call forwarding.

If the telecommunications switch 106 determines the customer premise equipment is available, the telecommunications switch 106 initiates the telephone call connection by sending a "setup" message to the digital loop carrier 108 (208). The "setup" message tells the digital loop carrier 108 there is a telephone call and identifies the path to use for the connection.

The digital loop carrier 108 receives the "setup" message and determines whether a connection to the customer premise equipment is capable of being established (210). In particular, the digital loop carrier 110 checks for any errors with the distribution resources that connect the customer premise equipment to the digital loop carrier 108 or for errors in the customer premise equipment itself. For example, a distribution resource error results when the bandwidth for a telephone connection is not available. Malfunctioning customer premise equipment is another example of a distribution resource error. Preferably, the digital loop carrier 108, distribution resources 116 and the customer premise equipment perform diagnostic tests periodically to determine whether there are errors.

If any errors with the distribution resources are found, the digital loop carrier 108 generates a distribution resource error message (212). The distribution resource error message is transmitted back to the telecommunications switch 106. Preferably the distribution resource error is indicated by a particular cause code in a "release complete" message in conformance with the GR303 standard. In response to receiving the distribution resource error, the telecommunications switch 106 applies terminating call features for the telephone call to the called party (214). The terminating call features are preferably voice mail or call forwarding. The terminating call features are pre-subscribed features associated with the called party.

If distribution resource errors are not found, the digital loop carrier 108 transmits a "connect" message to the telecommunications switch 106 (216) and establishes the telephone connection between the customer premise equipment and the telecommunications switch 106 (218). The telecommunications switch 106 then alerts the customer premise equipment that there is a telephone call (220).

As disclosed herein, communications between a digital loop carrier and a switch are enhanced. In particular, a telecommunications switch receives new information regarding failures occurring between a digital loop carrier and customer premise equipment connected to the digital loop carrier. With this new information the telecommunications switch terminates the call using terminating call features associated with the called party. This enhances communications for the calling party, who may avoid initiating a subsequent call by use of the terminating call features.

The invention being thus described, it will be evident that the same may be varied in many ways. Such variations are not to be regarded as a departure from the spirit and scope of the invention and all such modifications are intended to be included within the scope of the appended claims.

What is claimed is:

1. In a telecommunications system including a telecommunications switch connected to a digital loop carrier, a method for call establishment between the telecommunications switch and a customer premise equipment connected to the digital loop carrier, the method comprising the steps of:
    A) the telecommunications switch sending a request for a telephone call to the customer premise equipment;
    B) the digital loop carrier receiving the request for a telephone call;
    C) the digital loop carrier determining that a connection with the customer premise equipment cannot be established;
    D) the digital loop carrier generating a distribution resource error to indicate that a connection from the digital loop carrier to the customer premise equipment cannot be established;
    E) the digital loop carrier transmitting the distribution resource error to the telecommunications switch;
    F) the telecommunications switch receiving the distribution resource error; and
    G) the telecommunications switch applying a terminating call feature in response to the distribution resource error.

2. The method of claim 1 wherein the terminating call feature is one of voice mail and call forwarding.

3. The method of claim 1 wherein the distribution resource error is caused by a lack of bandwidth for a connection.

4. The method of claim 1 wherein the distribution resource error is caused by unavailability of at least one of: a digital subscriber line, an optical networking unit, a wireless interface, a T1 facility, and an integrated access device.

5. The method of claim 1 wherein the distribution resource error is caused by a fault in a connection to the customer premise equipment.

6. In a telecommunications system Including a telecommunications switch connected to a digital loop carrier, a method for call establishment between the telecommunications switch and a customer premise equipment connected to the digital loop carrier, the method comprising the steps of:
    A) the digital loop carrier receiving a request for a telephone call to the customer premise equipment;
    B) the digital loop carrier determining a lack of availability of a distribution resource needed for a connection from the digital loop carrier to the customer premise equipment;
    C) the digital loop carrier generating a distribution resource error to indicate the lack of availability of a distribution resource needed for a connection from the digital loop carrier to the customer premise equipment; and
    D) the digital loop carrier transmitting the distribution resource error to the telecommunications switch.

7. The method of claim 6 further comprising the step of:
    E) the telecommunications switch receiving the distribution resource error.

8. The method of claim 7 further comprising the step of:
    F) the telecommunications switch applying a terminating call feature in response to the distribution resource error.

9. The method of claim 8 wherein the terminating call feature is one of voice mail and call forwarding.

10. The method of claim 7 wherein the distribution resource error is caused by a lack of bandwidth for a connection.

11. The method of claim 7 wherein the distribution resource error is caused by unavailability of at least one of: a digital subscriber line, an optical networking unit, a wireless interface, a T1 facility, and an Integrated access device.

12. The method of claim 7 wherein the distribution resource error is caused by a fault in a connection to the customer premise equipment.

13. A telecommunications system comprising:
    a digital loop carrier that couples to a customer premise equipment for the transmission of telephone calls;
    a telecommunications switch that is coupled to the digital loop carrier;
    wherein in response to a request from the telecommunications switch to place a telephone call to the customer premise equipment, if the digital loop carrier cannot establish a connection from the digital loop carrier to the customer premise equipment, the digital loop carrier generates a distribution resource error and transmits the distribution resource error to the telecommunications switch; and
    wherein in response to receiving the distribution resource error, the telecommunications switch applies a terminating call feature.

14. The telecommunications system of claim 13 wherein the terminating call feature is one of voice mail and call forwarding.

15. The telecommunications system of claim 13 wherein the distribution resource error is caused by a lack of bandwidth for a connection.

16. The telecommunications system of claim 13 wherein the distribution resource error is caused by unavailability of at least one of: a digital subscriber line, an optical networking unit, a wireless interface, a T1 facility, and an integrated access device.

17. The telecommunications system of claim 13 wherein the distribution resource error is caused by a fault in a connection to the customer premise equipment.

18. A telecommunications system comprising:
   a digital loop carrier that couples to a customer premise equipment for the transmission of telephone calls;
   a telecommunications switch that is coupled to the digital loop carrier;
   wherein in response to a request from the telecommunications switch to place a telephone call to the customer premise equipment, if distribution resources needed for a connection to the customer premise equipment are unavailable, the digital loop carrier generates a distribution resource error and transmits the distribution resource error to the telecommunications switch.

19. The telecommunications system of claim 18 wherein the telecommunications switch applies a terminating call feature in response to receiving the distribution resource error.

20. The telecommunications system of claim 18 wherein the terminating call feature is one of voice mail and call forwarding.

21. The telecommunications system of claim 18 wherein the distribution resource error is caused by a lack of bandwidth for a connection.

22. The telecommunications system of claim 18 wherein the distribution resource error is caused by the unavailability of at least one of: a digital subscriber line, an optical networking unit, a wireless interface, a T1 facility, and an integrated access device.

23. The telecommunications system of claim 18 wherein the distribution resource error is caused by a fault in a connection to the customer premise equipment.

24. A telecommunications system comprising:
   a digital loop carrier that couples to a customer premise equipment;
   wherein in response to a request to place a telephone call to the customer premise equipment, if a distribution resource used to establish a connection between the digital loop carrier and the customer premise equipment is unavailable, the digital loop carrier generates a distribution resource error; and
   wherein the digital loop carrier transmits the distribution resource error to a telecommunications switch.

25. The telecommunications system of claim 24 wherein the telecommunications switch applies a terminating call feature in response to receiving the distribution resource error.

26. The telecommunications system of claim 25 wherein the terminating call feature is one of voice mail and call forwarding.

27. The telecommunications system of claim 24 wherein the distribution resource error is caused by a lack of bandwidth for a connection.

28. The telecommunications system of claim 24 wherein the distribution resource error is caused by the unavailability of at least one of: a digital subscriber line, an optical networking unit, a wireless interface, a T1 facility, and an integrated access device.

29. The telecommunications system of claim 24 wherein the distribution resource error is caused by a fault in a connection to the customer premise equipment.

* * * * *